United States Patent [19]

Kobayashi et al.

[11] 4,297,602

[45] Oct. 27, 1981

[54] MAGNETOSTRICTIVE CO-ORDINATE PLATE FOR CO-ORDINATE READER

[75] Inventors: Toshihiko Kobayashi, Mitaka; Tetsusaburo Kamibayashi, Niza, both of Japan

[73] Assignee: Kokusai Denshin Denwa Kabushiki Kaisha, Japan

[21] Appl. No.: 129,575

[22] Filed: Mar. 12, 1980

Related U.S. Application Data

[63] Continuation-in-part of Ser. No. 14,736, Feb. 23, 1979, abandoned, which is a continuation of Ser. No. 775,465, Mar. 8, 1977, abandoned.

[30] Foreign Application Priority Data

Mar. 10, 1976 [JP] Japan .................................. 51-25870
Apr. 23, 1976 [JP] Japan .................................. 51-46226

[51] Int. Cl.³ ............................................ H01L 41/12
[52] U.S. Cl. ..................................... 310/26; 333/148; 365/157
[58] Field of Search ................. 310/313 R, 313 B, 26; 333/148; 340/365 L, 166 R; 365/157

[56] References Cited

U.S. PATENT DOCUMENTS

| | | | |
|---|---|---|---|
| 2,552,139 | 5/1951 | Bocciarelli | 310/26 X |
| 3,052,873 | 9/1962 | Bobeck | 365/157 X |
| 3,351,922 | 11/1967 | Snyder | 365/157 X |
| 3,411,149 | 11/1968 | Shahbender | 365/157 X |
| 3,484,759 | 12/1969 | Hadden, Jr. | 365/157 X |
| 3,564,515 | 2/1971 | Gratian | 365/157 |
| 3,582,408 | 6/1971 | Onyshevych | 365/157 X |
| 3,612,924 | 10/1971 | Semmelink | 310/26 |
| 3,774,134 | 11/1973 | Kardashian et al. | 365/157 X |

*Primary Examiner*—Mark O. Budd
*Attorney, Agent, or Firm*—Robert E. Burns; Emmanuel J. Lobato; Bruce L. Adams

[57] ABSTRACT

A co-ordinate plate for a co-ordinate reader, which utilizes delays of oscillation waves in a magnetostrictive material. The co-ordinate plate is composed of two sheets of magnetostrictive material, which have a common co-ordinate plane and an acoustically insulating sheet therebetween, and in which propagation characteristics of the magnetostrictive oscillation waves are approximate to each other in a direction of a first line formed, on the co-ordinate plane, by the loci of many points having the same one of the two components of their co-ordinates and in a direction of a second line formed, on the co-ordinate plane, by the loci of many points having the other same component of the two components of their coordinates. Two exciting coils are provided for producing magnetostrictive oscillation in the thin plate of magnetostructive material in the directions of the first and second lines. Flux keepers are further provided for shielding magnetix fluxes emanating from the exciting coils.

16 Claims, 11 Drawing Figures

MAGNETOSTRICTIVE CO-ORDINATE PLATE FOR CO-ORDINATE READER

CROSS-REFERENCE TO RELATED APPLICATION

This application is a continuation-in-part of our co-pending application, Ser. No. 14,736, filed on Feb. 23, 1979 as a continuation application of an original application, Ser. No. 775, 465, filed on Mar. 8, 1977 and both now abandoned.

FIELD OF THE INVENTION

This invention relates to a co-ordinate reader which utilizes delays of oscillation waves in a magnetostrictive material.

DESCRIPTION OF THE PRIOR ART

A conventional co-ordinate reader of the type employing magnetostriction delay lines is simple in construction and easy to handle, so that it is widely used as an input device, an auto-drafter or the like in electronic computers. On a conventional co-ordinate plate, there are disposed in a matrix form parallel magnetostriction delay line groups in the Y and X directions, with a thin acoustically insulating sheet interposed therebetween, and the magnetostriction delay lines are each fixed at both ends to the co-ordinate plate by means of an adhesive so as to eliminate reflection noise. Further, exciting lines are each disposed to perpendicularly intersect the delay lines in the vicinity of one end of each of them. Upon application of a pulse current to the exciting line, in a case where a detecting coil is placed on the co-ordinate plate at a desired point, those portions of all the Y-direction delay lines which are in contact with the exciting line cause magnetostrictive oscillation. This oscillation propagates in each delay line toward the other end thereof, and when the oscillation has reached the position directly below the detecting coil, a magnetic flux variation caused by the oscillation induces a voltage in the detecting coil. Accordingly, the X co-ordinates at that point are digitized by measuring the time interval between the application time of the exciting pulse and the detection time of the output, that is, the delay time, by counting of clock pulses. Then, the Y co-ordinate of the point are obtained by exciting the exciting line in exactly the same manner as described above. In this case, the accuracy of the co-ordinate reading is dependent upon the propagation speed of the magnetostrictive oscillation, but since the magnetostrictive oscillation is relatively low in propagation speed, a resolving power of 0.25 mm is obtained in a case where the delay line is formed of a 50% iron-cobalt alloy. However, in the case of such a conventional device as described above, a magnetostrictive material is drawn and rolled to obtain ribbon-like delay lines, which are then disposed on the co-ordinate plate one by one to form a co-ordinate plate. This leads to defects that the productivity is low and that the improvement in accuracy that can be realized is limited due to variations in the characteristics resulting from dispersion in the tensile forces of the individual delay lines.

SUMMARY OF THE INVENTION

An object of this invention is to provide a co-ordinate plate for use in co-ordinate readers, which overcomes the abovesaid defects, and which facilitates package production of delay lines and setting them on a co-ordinate plate to achieve a high accuracy, a low cost and miniaturization of the co-ordinate plate.

To attain the above object, the present invention employs a thin plate of magnetostrictive material composed of two sheets, which have a common co-ordinate plane and an acoustically sheet seated therebetween, and in which propagation characteristics of the magnetostrictive oscillating waves are approximate to each other in a direction of a first line formed, on the co-ordinate plane, by the loci of many points having the same one of two components of their co-ordinates, and in a direction of a second line formed by the loci of many points having the other same component of the two components of their co-ordinates.

On the plate of magnetostrictive material of the two-layer construction, there are disposed two exciting coils for producing magnetostrictive oscillation in the directions of the abovesaid first and second lines. Further, flux keepers may be disposed for shielding fluxes emanating from the two exciting coils.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
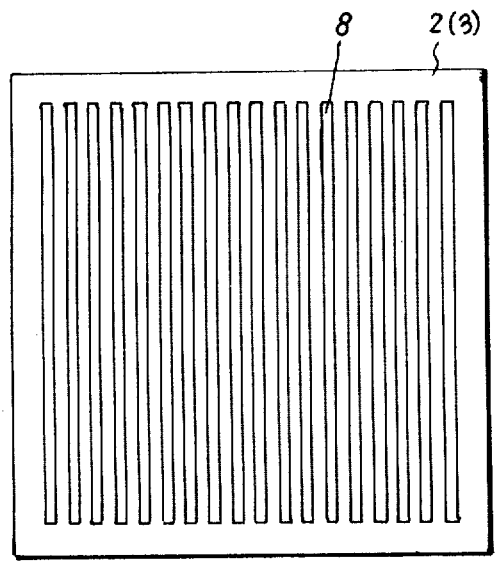
FIG. 1 is a plan view illustrating an example of a thin plate of magnetostrictive material having parallel slits for use in this invention.

FIG. 1 shows an example of a sheet of magnetostrictive material having parallel slits, which is used in this invention. In this case, a thin sheet of, for example, an iron-cobalt alloy, is provided by photoetching techniques with many parallel slits 8, by which parallel magnetostiction delay lines can be easily obtained.

Figure 2:
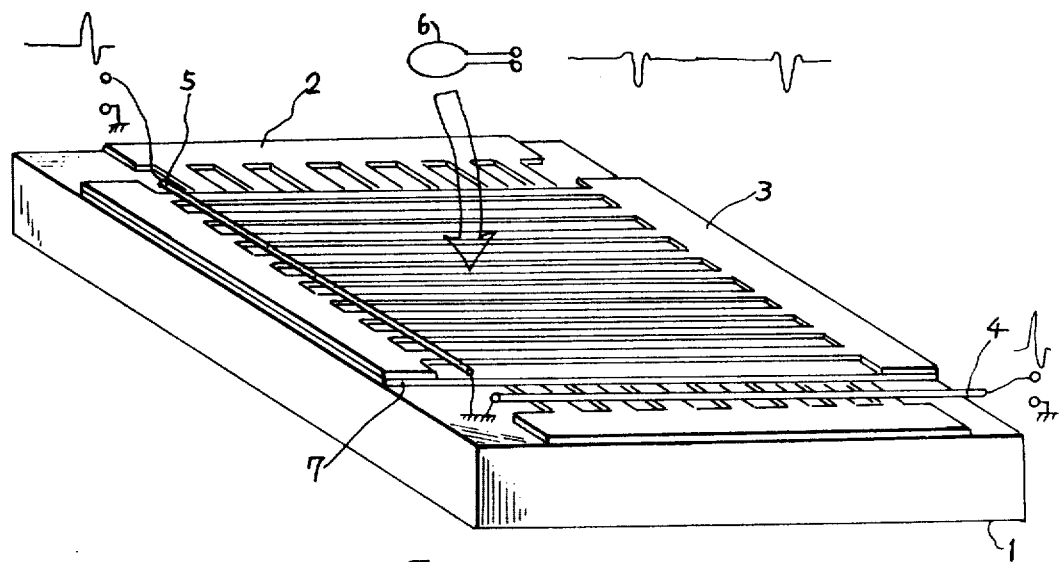
FIG. 2 is a perspective view illustrating an embodiment of this invention.

Then, as shown in FIG. 2, two such sheets 2 and 3 are placed one on the other, with an acoustically insulating sheet 7 sandwiched therebetween, in such a manner that the slits of each of the sheets perpendicularly intersect the slits of the other. The acoustically insulating sheet 7 is employed to attenuate undesirable transmission of magnetostrictive waves between sheets 2 and 3 and formed by a light and flat material of hight attenuation against magnetostrictive waves, such as resin (e.g. polyethylene telephtalate). Both of the sheets 2 and 3 are fixed by adhesive at respective ends to the co-ordinate plate 1. The X- and Y-direction exciting lines 4 and 5 are each disposed to extend along one end of each sheet, as shown. A detecting coil 6 is positionable on the co-ordinate plate relative to the co-ordinate system defined by the sheets 2 and 3.

The sheet of magnetostrictive material for use in this invention may be a mechanically rolled one, or a sheet of a magnetostrictive material electroplated on an electrode having a smooth surface such as stainless steel. Further, one sheet can also be formed using a multilayer film.

It is also possible to employ a sheet which is obtained by forming the parallel slits 8 in a resilient sheet of conductor and then by electroplating it with a magnetostrictive material. The resilient conductor serves as the ground for electroplating, and, at same time enhances the propagation efficiency of magnetostrictive oscillation, so that even if the delay line is long attenuation is kept small to provide for improved characteristics of the delay line.

Figure 3A:
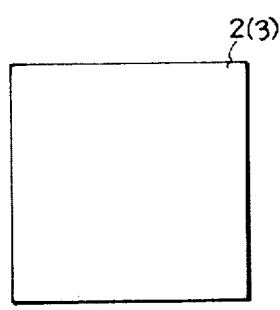
FIGS. 3A, 3B, 3C, 3D and 3E are plan views each illustrating an example of the configuration of a thin plate of magnetostrictive material for use of this invention.
Figure 3B:
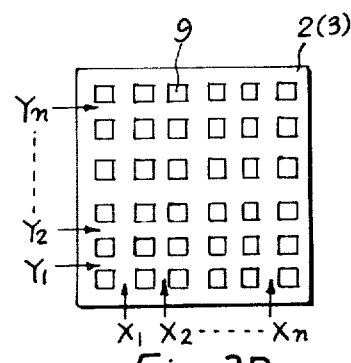
Figure 3C:
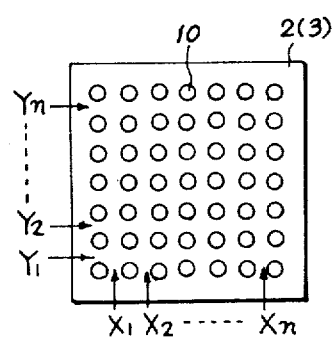
Figure 3D:
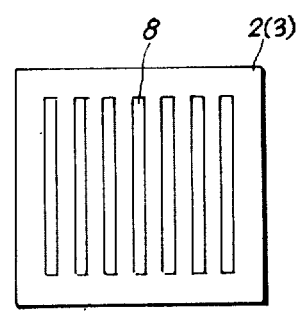
Figure 3E:
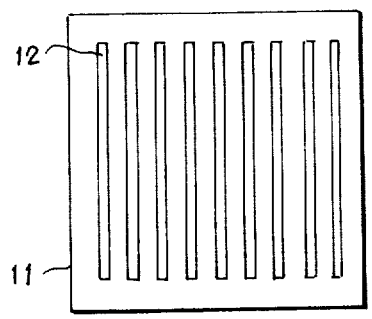

In the above, the magnetostrictive thin sheets 2 and 3 are each described as having a uniform, flat surface, as shown in FIG. 3A. However, it is also possible to employ other configurations such, for example, as shown in FIGS. 3B and 3C, in which square or circular holes 10 are arranged in a matrix form on the co-ordinate plane so that many oscillating wave propagation paths $X_1, X_2, \ldots X_n$ and $Y_1, Y_2, \ldots Y_n$ may be formed at predetermined intervals in two directions of the axes of co-ordinates on the co-ordinate plane, that is, in the aforesaid directions of first and second lines, respectively. Moreover, it is possible to use such magnetostrictive material sheets 2 and 3 such as shown in FIG. 3E in which many parallel magnetostrictive material lines 12 are deposited on a substrate 11. FIG. 3D shows the same sheet as illustrated in FIG. 1.

The magnetostrictive material thin plate of the two-layer construction can be obtained by a desired combination of two of the sheets of the same or different kinds, selected from the sheets of FIGS. 3A, 3B, 3C, 3D and 3E.

Figure 4B:
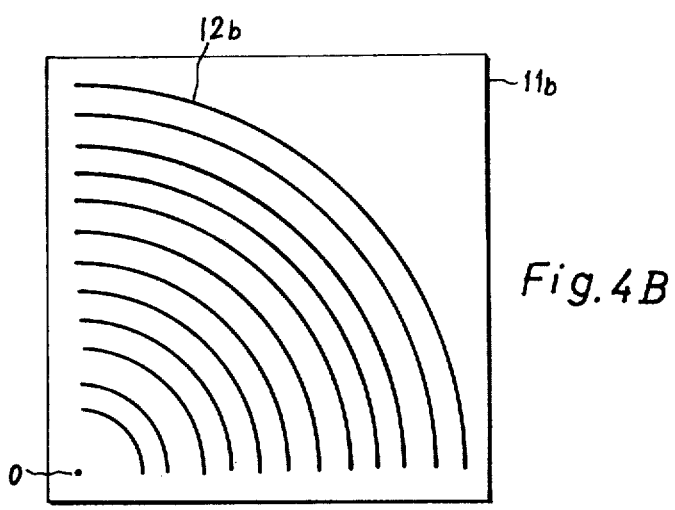
FIGS. 4A, 4B are plan views illustrating a set of examples of thin plates of magnetostrictive material for use in an embodiment of this invention using the polar co-ordinate system.
Figure 4A:
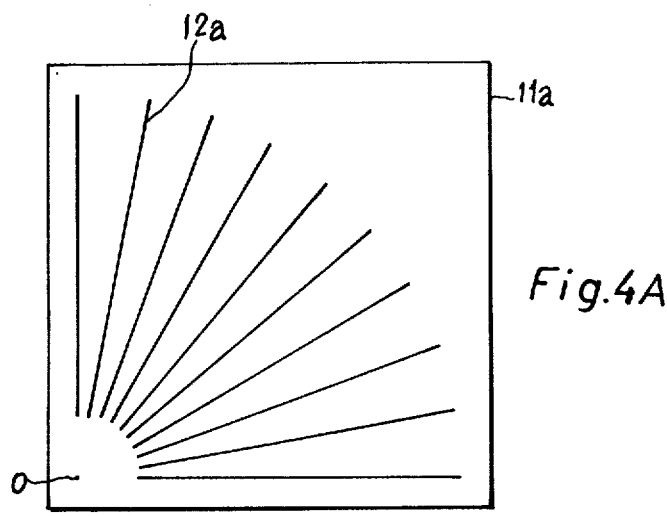

Further, the co-ordinate system need not be limited specifically to the rectangular co-ordinate system, but may also be the oblique or polar co-ordinate system. In this case, a two-layer magnetostrictive material thin plate can be formed with sheets such as shown in FIGS. 4A and 4B. The sheet of FIG. 4A is one that many magnetostrictive material lines 12a are deposited on a substrate 11a in such a manner that the aforesaid first oscillating wave propagation paths may be formed to pass through the origin O of the polar co-ordinate system and extend radially thereof in directions dividing the co-ordinate plane into substantially equal angles. The sheet of FIG. 4B is one that many magnetostrictive material lines 12b are deposited on a substrate 11b in such a manner that the aforesaid second oscillating wave propagation paths may be formed to extend along concentric circles about the origin O of the polar co-ordinate system. Such sheets are assembled together, with their origins in alignment with each other, to provide the two-layer magnetostrictive material thin plate. In this case, such slits as indicated by 8 in FIG. 3D may also be formed in place of the magnetostrictive material lines 12a and 12b shown in FIGS. 4A and 4B.

Furthermore, it is desirable that the magnetic anisotropy of the magnetostrictive material used for the magnetostrictive material thin plate be set along each oscillating wave propagation path. However, it is also possible to employ a magnetostrictive material which has a magnetic isotropy, or a magnetic anisotropy in the direction of thickness of the film. Moreover, in the case of the rectangular co-ordinate or oblique co-ordinate system, X- and Y-direction outputs of substantially the same value can be obtained by providing the magnetic anisotropy along a line of direction which substantially bisects the angle made by the directions of the abovesaid first and second oscillating wave propagation paths (and which is a line extending in a direction of 45°), or a direction crossing the abovesaid line of direction at right angles thereto.

When the thickness of the magnetostrictive material is, for example, less than 20 μm, attenuation increases in the propagation of magnetostriction oscillation, and when more than 5 mm, a very large current is required for causing the magnetostrictive oscillation. In either case, such a thickness is not preferred. Accordingly, the thickness of the magnetostrictive material used is suitably selected to be intermediate between the above values in accordance with the purpose of use and the condition of an external detector.

Figure 5:
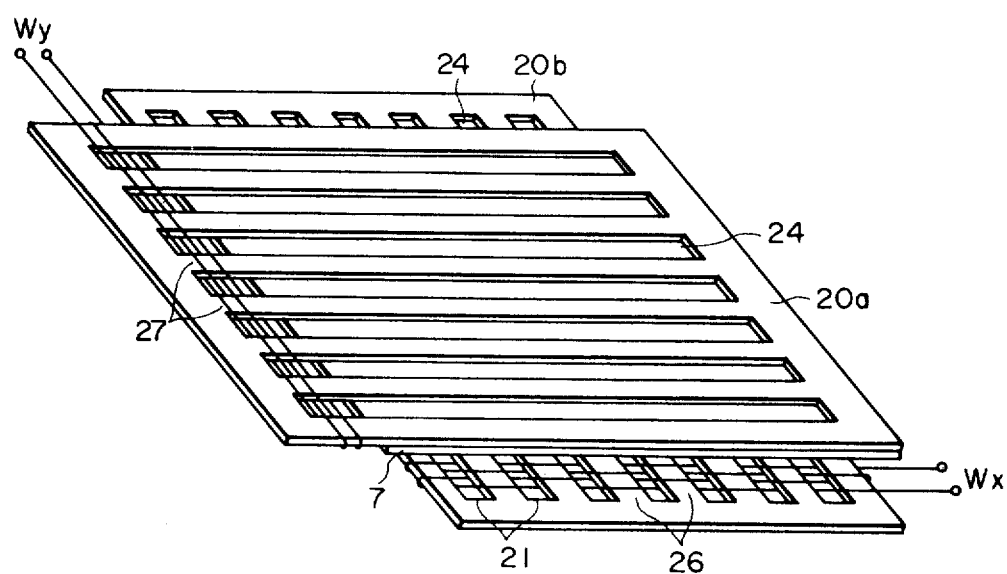
FIG. 5 is a perspective view illustrating another embodiment of this invention.

Next, FIG. 5 shows another embodiment of this invention in which two magnetostrictive material sheets 20a and 20b, each having many parallel slits 24, are placed one on the other.

In the present invention, the first and second exciting coils $W_x$ and $W_y$ are provided by which adjacent ones of first and second unit excitation parts 26 and 27, which are respectively separated by the aforesaid cut-out portions 21 or the windows or holes 24 and arranged to extend in parallel with the two co-ordinate axes, are excited in opposite polarities along the co-ordinate axes, respectively.

The exciting coils $W_x$ and $W_y$ may also be wound around each of the unit excitation parts 26 and 27 so that adjacent ones of the unit excitation parts are excited in opposite polarities alternately, as described above.

Figure 6:
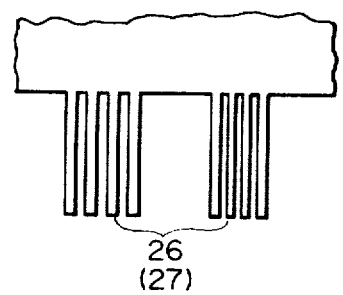
FIG. 6 is a fragmental plan view illustrating a modification of a part of the thin plate of magnetostrictive material for use in this invention.

The excitation efficiency can be further enhanced by dividing each of the unit excitation parts 26 and 27 into a plurality of excitation segments, as illustrated in FIG. 6.

Our experimental results show that in a case where the exciting coils were not wound to cancel the fluxes caused by the exciting currents as in the present invention, a signal which was produced by magnetostrictive oscillation in an area within about 5 cm perpendicularly from the position of each exciting coil, was disturbed by a noise which was directly induced to the detecting coil from the exciting coil, with the result that an erroneous operation occurred to make a co-ordinate indication inaccurate. However, it has been found that according to this invention, a normal operation is obtained at a distance of about 1 cm perpendicularly from the position of the exciting coil. The effect of the invention is very striking.

An iron-cobalt alloy has a magnetostrictive coefficient, which largely varies in accordance with the composition. In case of an iron-cobalt alloy plate produced by the electric plating method, the magnetostrictive coefficient becomes maximum at the vicinity of a composition of 20% iron-80% cobalt. As the above co-ordinate plate of this invention, the composition range of 10% iron-90% cobalt to 48% iron-52% cobalt is suitable. In this case, the output pulse of a conventional co-ordinate plate can be strengthened by several times to several ten times by the use of the above iron-cobalt alloy.

As has been described in the foregoing, the present invention is to provide a co-ordinate reader utilizing magnetostrictive oscillating waves which is simple in construction, high in productivity, easy of miniaturization and highly accurate. The co-ordinate reader of this invention is of very wide application, but is of particular utility when employed as an input device for picture processing or other purposes. Further, the co-ordinate reader is also suitable for popular use such as a device for obtaining the length of a curve or an area. Accordingly, the present invention is very valuable from the industrial point of view.

What we claim is:

1. A co-ordinate plate for a co-ordinate reader, comprising: a pair of thin sheets of magnetostrictive material, each of said sheets of magnetostrictive material having a dimension defined by a preferred direction of magnetostrictive oscillating wave propagation within a sheet, and said pair of sheets of magnetostrictive material superposed and oriented with their respective preferred directions of magnetostrictive oscillating wave propagation defining respective co-ordinate axes of a co-ordinate system; an acoustically insulating sheet of material disposed between said pair of sheets of magnetostrictive material for keeping said pair of sheets of magnetostrictive material from contacting each other, and said pair of thin sheets and said acoustically insulating sheet disposed with said pair of thin sheets of magnetostrictive material in contact with said acoustically insulating sheet to define a co-ordinate plane; and exciting means for producing magnetostrictive oscillating waves propagating in the respective preferred directions of propagation in said pair of sheets of magnetostrictive material.

2. A co-ordinate plate for a co-ordinate reader according to claim 1, wherein the respective thin sheets of magnetostrictive material have approximately the same propagation characteristics in their respective preferred directions of propagation.

3. A co-ordinate plate for a co-ordinate reader according to claim 1, wherein at least one of the two sheets has a uniform flat surface.

4. A co-ordinate plate for a co-ordinate reader according to claim 1, wherein at least one of the two sheets has holes formed in a matrix in the co-ordinate plane so that many first and second oscillating wave propagation paths are formed at predetermined intervals in the respective preferred directions of propagation.

5. A co-ordinate plate for a co-ordinate reader according to claim 1, wherein at least one of the two sheets has many parallel slits in the co-ordinate plane at predetermined intervals defining a plurality of oscillating wave propagation paths at predetermined intervals in the preferred directions of propagation of the magnetostrictive oscillating waves.

6. A co-ordinate plate for a co-ordinate reader according to claim 1, wherein the preferred directions of propagation define the ordinate and abscissa of a rectangular co-ordinate system, respectively.

7. A co-ordinate plate for co-ordinate reader according to claim 1, wherein the preferred directions of propagation define the axes of an oblique co-ordinate system.

8. A co-ordinate plate for a co-ordinate reader according to claim 5, wherein first oscillating wave propagation paths are formed to pass through the origin of a polar co-ordinate system and extend radially thereof to divide the co-ordinate plane into substantially equal angles, and second oscillating wave propagation paths are arranged to extend along concentric circles about the origin of the polar co-ordinate system.

9. A co-ordinate plate for a co-ordinate reader according to claim 1, wherein at least one of the two sheets is a magnetostrictive material sheet having magnetostrictive materials deposited on the surface of its substrate.

10. A co-ordinate plate for a co-ordinate reader according to claim 1, wherein the two sheets have magnetic isotropy.

11. A co-ordinate plate for a co-ordinate reader according to claim 1, wherein the two sheets have magnetic anisotropy in the direction of their thickness.

12. A co-ordinate plate for a co-ordinate reader according to claim 1, wherein the two sheets have magnetic anisotropy in a direction of a line substantially bisecting the angle made by the preferred directions of propagation or in a direction perpendicularly intersecting the said direction.

13. A co-ordinate plate for a co-ordinate reader according to claim 1, further comprising, on said thin plate of magnetostrictive material, a plurality of first and second unit excitation parts arranged to extend in parallel with the two co-ordinate axes, respectively, the first and second unit excitation parts being provided by forming a plurality of windows at regular intervals in the marginal portions of the thin plate respectively corresponding to the co-ordinate axes; said exciting means exciting adjacent ones of the first and second unit excitation parts in opposite polarities along the co-ordinate axes, respectively.

14. A co-ordinate plate for a co-ordinate reader according to claim 13, wherein the first and second exciting coils are respectively disposed to be threaded between the many unit excitation parts.

15. A co-ordinate plate for a co-ordinate reader according to claim 13, wherein said exciting means comprises first and second exciting coils respectively disposed wound around the unit excitation parts.

16. A co-ordinate plate for a co-ordinate reader according to claim 13, wherein the unit excitation parts are each divided into a plurality of small excitation segments.

* * * * *